United States Patent

Hiraki

[15] 3,680,872

[45] Aug. 1, 1972

[54] EMBEDDED ADAPTER FOR TURNTABLE

[72] Inventor: Takayuki Hiraki, Tokohama, Japan

[73] Assignee: Pioneer Electronic Corporation, Tokyo, Japan

[22] Filed: Dec. 2, 1970

[21] Appl. No.: 94,521

[30] Foreign Application Priority Data

Dec. 9, 1969 Japan........................44/116340

[52] U.S. Cl.................................................274/39 B
[51] Int. Cl................................................G11b 3/60
[58] Field of Search........................................274/39

[56] References Cited

UNITED STATES PATENTS

| | | | |
|---|---|---|---|
| 2,799,509 | 7/1957 | Thomas | ...274/39 |
| 3,034,795 | 5/1962 | Guest | ...274/39 |
| 3,241,840 | 3/1966 | Freier | ...274/39 |
| 3,418,000 | 12/1968 | Sherwood | ...274/39 |

FOREIGN PATENTS OR APPLICATIONS

| | | | |
|---|---|---|---|
| 1,251,050 | 9/1967 | Germany | ...274/39 |

*Primary Examiner*—Leonard Forman
*Assistant Examiner*—Charles E. Phillips
*Attorney*—Sughrue, Rothwell, Mion, Zinn & Macpeak

[57] ABSTRACT

An adapter for a doughnut type phonograph record disc which is embedded in a recess of the turntable when an ordinary LP record is to be played, comprises a supporting plate having an upwardly rising annular ridge forming a fulcrum, an annular toggle spring plate placed on said supporting plate, a cylindrical body serving as the adapter and having its lower edge abutting with the upper surface of the spring plate along an outer circumferential position, and a depressing plate located inwardly of said cylindrical body and having its lower edge abutting with the upper surface of the spring plate along an inner circumferential position, all of these members being included inside of a recessed portion of the turntable, whereby when the depressing plate is pushed downwardly, said cylindrical body rises up to engage the central hole of the doughnut type record.

3 Claims, 5 Drawing Figures

EMBEDDED ADAPTER FOR TURNTABLE

BACKGROUND OF THE INVENTION

1. FIELD OF THE INVENTION

This invention relates to an adapter which is placed between the central shaft of a turntable and the inner periphery of the central bore of a 45 r. p. m. or doughnut type record disc when such a record is played so that the doughnut type record is accurately centered on the turntable.

2. DESCRIPTION OF THE PRIOR ART

In the prior art, besides a simple adapter manually placed on the turntable spindle each time a doughnut type record disc is played, there have been proposed more complicated types of adapters. One type is mounted in an embedded manner on the central portion of the turnable and is so constructed that the adapter is always biased toward a raised position. When a 33 r. p. m. or LP is placed on the turntable, the adapter is lowered by the weight of the record against the spring force until the record is suitably placed on the turntable, and when the record is removed, the adapter is raised again to its original position. Another example of such a complicated type of adapter has a construction wherein the adapter is brought into the lowered position by depressing, and when it is desired to be brought upward, the adapter is pulled by fingers inserted into a narrow hole of the adapter.

However, in the former type adapter which is sunk by the weight of the record, the spring force is difficult to adjust, and the latter type adapter which is pulled up by fingers has been found to be too difficult to be handled by women and children.

SUMMARY OF THE INVENTION

Therefore, the primary object of the present invention is to provide an improved embedded type adapter whereby the above described drawbacks of the conventional adapters can be substantially eliminated.

Another object of the invention is to provide an improved embedded type adapter which is simple in construction an economical in production.

Still another object of the invention is to provide an improved embedded type adapter which is accurate in its operation and has a long working life despite frequent use.

These and other objects of the invention can be achieved by an improved construction of the embedded type adapter which comprises a supporting plate having an upwardly rising annular ridge forming a fulcrum, an annular spring plate having a series of gathered portions around its periphery and placed on the ridge portion of the supporting plate, a cylindrical body serving as the adapter having its lower edge abutting the upper surface of the spring plate along an outer circumferential position, and a depressing plate located inwardly of said cylindrical body and having its lower edge abutting the upper surface of said spring plate along an inner circumferential position, all of these members being included inside a recessed portion of the turntable surrounding the turning shaft or spindle of the turntable, whereby the cylindrical body serving as the adapter is raised upward when the depressing plate is pushed downwardly.

The nature, principle, and utility of the invention will be more clearly understood from the following detailed description of the invention when read in conjunction with the accompanying drawings wherein like members are designated by like reference numerals or symbols.

DETAILED DESCRIPTION OF THE INVENTION

Figure 1:
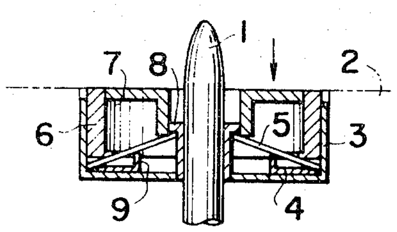
FIG. 1 is a sectional view showing an adapter according to the present invention in its lowered position.
Figure 2:
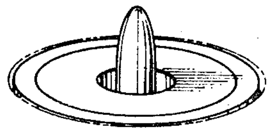
FIG. 2 is a perspective view of the adapter shown in FIG. 1.
Figure 5:
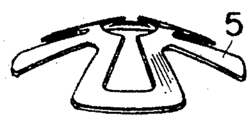
FIG. 5 is a perspective view of the spring plate employed in the present invention.

FIG. 1 shows a rotating shaft 1 of a turntable 2 and a recessed portion around the shaft 1 formed in the central portion of the turntable 2. Within the recessed portion, there is provided an adapter housing 3 having an outer peripheral wall, a bottom wall, and an annular inner wall contacting the rotating shaft 1. In this adapter housing 3, there is inserted a supporting plate 4 having an annular upwardly rising ridge portion 9 at an intermediate position between the outer peripheral wall and the inner wall contacting the shaft 1 of the adapter housing 3. On this supporting plate 4, a spring plate 5 having a series of gathered portions, as shown in FIG. 5, is placed so that the spring plate 5 is supported by the annular ridge portion 9 which acts as a fulcrum. The spring plate 5 is a toggle or bistable type of spring well known in the art having two stable, extreme positions.

A cylindrical body 6, which is employed as the adapter engageable with the doughnut type record disc, is slidably inserted inside the adapter housing 3, so that its lower edge contacts the outer periphery of the spring 5, and a depressing plate 7 which has an annular downwardly projecting portion in contact with the annular spring plate 5 at its inner periphery is inserted within the cylindrical body 6. After the insertion of the depressing plate 7, the upper edge of the annular inner wall of the adapter housing 3 is flared outwardly as indicated by 8 in FIG. 1, and the assembling of the adapter is completed.

If the adapter is required to be elevated for the purpose of playing a doughnut type record disc, the plate 7 shown in FIG. 1 is depressed downwardly as indicated by the arrow. When the plate 7 is depressed downwardly, the downwardly projecting portion of the plate 7 pushes the annular spring plate downwardly at its inner periphery, whereby the spring plate 5 is tripped to another state with the outer periphery located above the inner periphery, and the cylindrical body 6 forming the adapter is raised upwardly.

Figure 3:
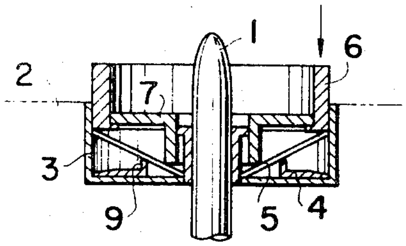
FIG. 3 is a sectional view showing the adapter in the raised position.
Figure 4:
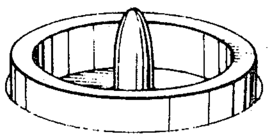
FIG. 4 is a perspective view of the adapter shown in FIG. 2.

When the thus adapter is desired to be lowered as indicated in FIG. 1, the cylindrical body 6 acting as an adapter in FIG. 3 is pushed down, for instance by fingers along the arrow. In that case, the outer peripheral portion of the annular spring plate 5 is depressed downwardly by the lower end of the cylindrical body 6, and the spring plate 5 is tripped to the original state having the inner edge above the outer edge, whereby the plate 7 is brought back to its original position flush with the upper surface of the turntable.

WHAT IS CLAIMED IS:

1. An adapter to permit the centering and playing of doughnut type disc records on a phonograph turntable including a central spindle and a recess in the turntable surrounding the spindle, comprising:

a supporting plate having an upwardly rising annular ridge forming a fulcrum, an annular toggle spring plate having two stable, extreme states, placed on said supporting plate over the fulcrum, wherein the fulcrum contacts the spring intermediate it's outer and inner circumferences, and wherein when the spring is in one state the outer peripheral edge of the spring is above the fulcrum and the inner peripheral edge is below the fulcrum and wherein when the spring is in its second state the relative positions are interchanged, a cylindrical body serving as the adapter and having a lower edge abutting the upper surface of said spring plate along the outer circumference thereof, and a depressing plate located inwardly of said cylindrical body and having a depending lower edge abutting the upper surface of said spring plate along the circumference thereof, all of the above members being included inside of the recessed portion of the turntable surrounding the spindle, whereby when the depressing plate is pushed down, said cylindrical body serving as the adapter is raised up.

2. An adapter as defined in claim 1, wherein said annular toggle spring plate is formed to have a series of gathered portions around its periphery.

3. An adapter as defined in claim 1, wherein said depressing plate is flush with the upper surface of the turntable when the depressing plate is not depressed.

* * * * *